United States Patent [19]

Goldmann et al.

[11] 4,050,883

[45] Sept. 27, 1977

[54] APPARATUS AND METHODS FOR THE HEAT TREATMENT OF FINE-GRAINED MATERIALS

[75] Inventors: Wolf Goldmann; Georg Schepers; Otto Heinemann, all of Ennigerloh; Heinz-Herbert Schmits, Rheda-Wiedenbruck; Horst Ritzmann, Enniger, all of Germany

[73] Assignee: Polysius AG, Neubeckum, Germany

[21] Appl. No.: 674,951

[22] Filed: Apr. 8, 1976

[30] Foreign Application Priority Data

May 6, 1975 Germany .............................. 2520102

[51] Int. Cl.² ............................................ F27B 15/00
[52] U.S. Cl. .......................................... 432/14; 34/10; 34/57 A; 432/106
[58] Field of Search ....................... 432/14, 15, 16, 17, 432/106; 34/10, 57 A

[56] References Cited

U.S. PATENT DOCUMENTS

| | | | |
|---|---|---|---|
| 3,832,128 | 8/1974 | Paul | 432/14 |
| 3,903,612 | 9/1975 | Warshawsky et al. | 432/106 |
| 3,940,236 | 2/1976 | Weber et al. | 432/14 |
| 3,975,148 | 8/1976 | Fukuda et al. | 432/106 |

*Primary Examiner*—John J. Camby
*Attorney, Agent, or Firm*—Learman & McCulloch

[57] ABSTRACT

Fine grained material such as ground raw cement is delivered in a stream from a preheater to an upright gas conduit through which furnace exhaust gases flow to the preheater. In different cross-sectional areas of the conduit the velocity of the gas differs. The stream of material falls upon a distributor in the conduit to distribute the material over the cross-sectional area of the conduit. The distributed material falls through a combustion zone and a substantial fraction of such material is entrained by the exhaust gas and passes again through the combustion zone enroute to the preheater. The distributor is adjustable to enable the concentration of material in different cross-sectional areas of the conduit to vary according to differences in the gas velocities in such cross-sectional areas.

13 Claims, 7 Drawing Figures

APPARATUS AND METHODS FOR THE HEAT TREATMENT OF FINE-GRAINED MATERIALS

This invention relates to apparatus and methods for the heat-treatment of fine granular material, such as ground raw cement, utilizing a rotary kiln and a preheater through which exhaust gases from the kiln are passed, the preheater comprising a number of cyclone stages communicating with the kiln by a gas conduit which leads from the rotary kiln to the final cyclone stage. Granular material from the penultimate cyclone stage enters the gas conduit at an entry zone below which is disposed a distributor member for breaking up the stream of material. Below the distributor member a fuel feed pipe terminates in the gas conduit to form a firing zone extending over substantially the entire cross-section of the gas conduit. A substantial fraction of the material passes through the firing zone more than once, as described in U.S. Pat. No. 3,940,236.

In the manufacture of cement, alumina, lime, magnesite, dolomite and the like, the heat treatment of the fine granular material frequently is effected by first preheating the material in a preheater comprising a number of cyclones, using hot exhaust gases from a rotary kiln, and before the material receives its final firing or sintering in the rotary kiln. In such case the greater part of the heating operation is provided in the rotary kiln, while only a lesser part of the total heat energy is applied to the material in the preheater. Because of the higher specific capital costs of the rotary kiln this does not represent an optimum division of the heating operation between the rotary kiln and the preheater.

To enable the rotary kiln to be made smaller in cross-section and/or length, a pre-firing zone has previously been provided between the preheater and the rotary kiln with the preheated material heated as strongly as possible in this zone. The particular problem in designing such a pre-firing zone is to ensure extremely uniform fuel supplies whereby to avoid any over-firing of individual particles of material (with all the associated evils such as caking, agglomerating, etc.).

In one known plant the pre-firing zone comprises a fluidized layer directly heated by burners. Another known plant utilizes a firing chamber with the material and fuel entering and leaving tangentially. In both cases the exhaust gases from these pre-firing zones combine with those from the rotary kiln. The disadvantage of these two devices lies in the high capital cost of the pre-firing zone which loses a considerable proportion of the savings made with the rotary kiln.

In another known device, in addition to the material outlet conduit from the penultimate cyclone stage, a fuel feed line and a cooler air line also terminate in the gas conduit leading from the rotary kiln to the cyclone preheater. In this way the gas conduit between the kiln and the cyclone preheater is utilized to provide the pre-firing zone. It has however been found that such gas conduit needs to be relatively long in order to apply to the granular material at least the greater part of the heat energy from the fuel additionally supplied to the conduit, before the material has been deposited in the lowest cyclone stage of the preheater. However, plant costs and space requirements are both considerably increased with the length of the gas conduit between rotary kiln and cyclone preheater.

These defects of known constructions were overcome with the device disclosed in the aforementioned patent in that below the inlet of the material conduit through which passes material from the penultimate cyclone stage the gas conduit leading from the rotary kiln to the cyclone preheater is provided with a distributor member, and below this distributor member the fuel feed line enters the gas conduit in such manner that a firing zone is formed which extends over substantially the entire cross-section of said gas conduit and is passed through more than once by at least a substantial fraction of the material.

The disposition of such a distributor member immediately above the fuel inlet ensures that as soon as fuel enters the gas conduit it is immediately and very uniformly mixed with the particles of material, hence ensuring optimum burning of the fuel around or in the immediate vicinity of the individual particles of material.

If in addition the fuel supply is such that a combustion zone extending substantially over the full cross-section of the gas conduit is formed, and if also the appropriate level of this combustion zone ensures that at least a substantial fraction of the material passes more than once through the combustion zone (the particles first move downward after introduction into the gas conduit and are then upwardly entrained by the counter-flowing gases), optimum conditions are provided for intensive transfer of heat from the fuel to the material.

The principal objective of the present invention is to provide a device which retains the advantages of the apparatus disclosed in the aforementioned patent and which achieves even greater improvement of the heat transfer in the pre-firing zone.

According to the invention this objective is attained by the provision of a distributor member which is adjustable to match the distribution of material to the gas flow.

It has in fact been observed that gas flow in the conduit leading from the rotary kiln to the cyclone preheater is not completely uniform when considered over the cross-section of that conduit. For a great variety of reasons, including the rotary movement of the kiln, the conduit leading from the rotary kiln to the cyclone preheater often exhibits a gas flow which is stronger, or has a greater velocity, in one part of the conduit cross-section than in another. The material fed into this gas conduit however favors the weaker or slower flow areas as it moves through the conduit.

Since making the gas flow uniform over the gas conduit cross-section, which would in itself be desirable, can hardly be effected by any simple means, apparatus according to the invention adopts the alternative of matching the distribution of material to the gas flow, i.e., of ensuring that material is fed in an increased degree or concentration to the cross-sectional zones favored by the gas flow. This thus prevents major amounts of material shooting down to the kiln through areas of the conduit cross-section with relatively weak gas flow, without being upwardly deflected by the kiln exhaust gases and first fed to the lowermost cyclone stage.

In accordance with the invention, this matching of material distribution to the gas flow within the cross-section of the gas conduit leading from the rotary kiln to the cyclone preheater is effected by adjusting the distributor member. This adjustment can be provided for instance by rotation about a generally horizontal axis and/or by moving the distributor member in a generally horizontal cross-sectional plane in the gas conduit. However further modes of movement are also possible.

There are also numerous variations for the constructional form of the distributor member (e.g., frustoconical, a rooflike or upwardly peaked structure, a dish or plate, a deflector tube, etc.).

Several embodiments of the invention are shown in the accompanying drawings, in which.

Figure 1:
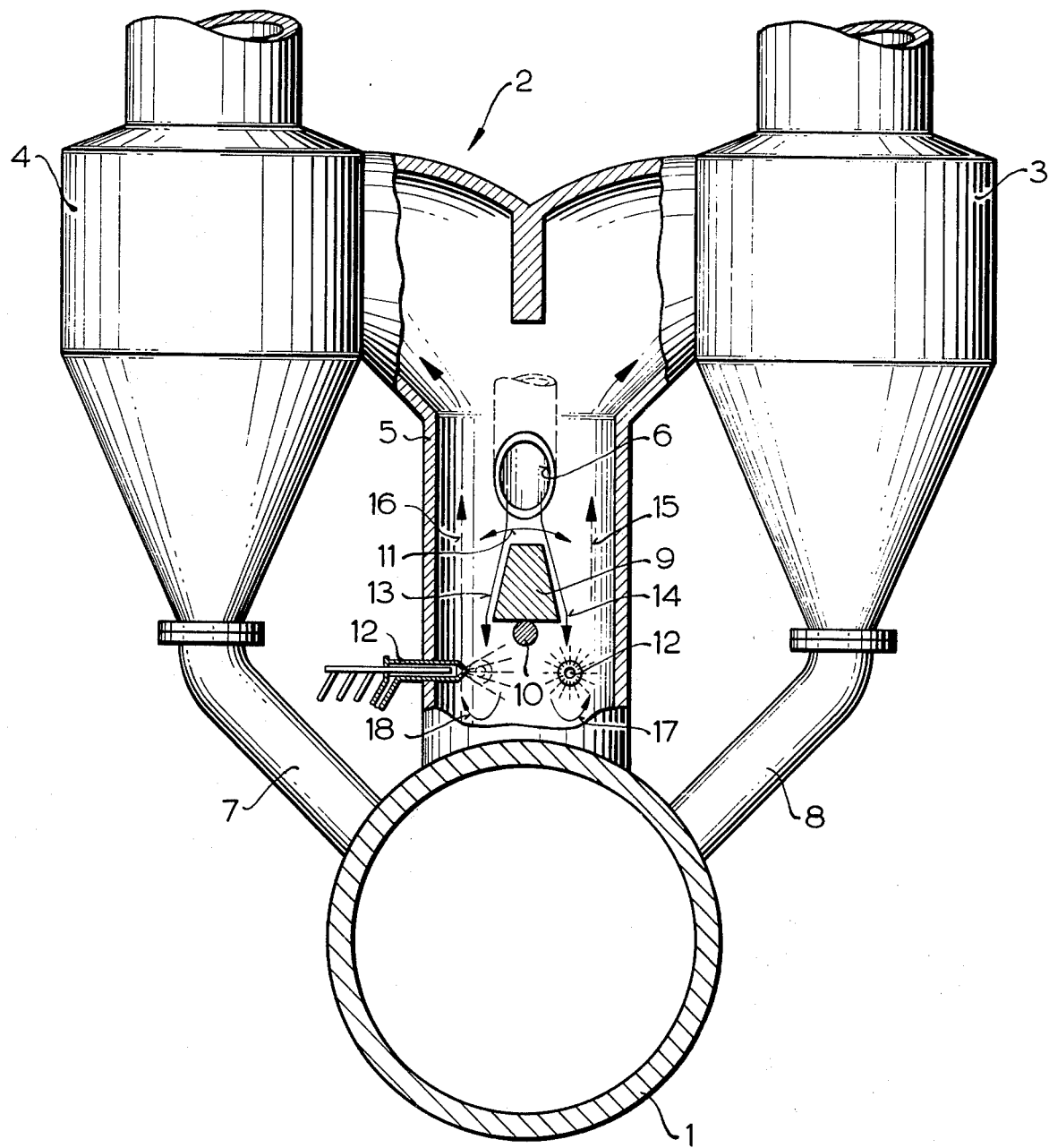
FIG. 1 is a schematic vertical section through that part of a plant comprising a rotary kiln and a cyclone preheater, which is important in understanding the invention.

The device shown in FIG. 1 for the heat treatment of fine granular material, such as ground raw cement, comprises a rotary kiln 1 and a preheater 2 formed of several cyclone stages through which pass the exhaust gases from the rotary kiln 1. FIG. 1 shows only the two cyclones 3 and 4 of the lowest cyclone stage in this preheater 2. Other, similar cyclone stages (not shown) are arranged above the lower stage. A gas conduit 5 takes the exhaust gases from the rotary kiln 1 to cyclones 3 and 4 of the lowest cyclone stage in the preheater 2. A material outlet 6 from the penultimate upper cyclone stage (not shown) terminates in the gas conduit 5, while the outlet conduits 7, 8 of the lowest cyclones 3, 4 feed the material to the rotary kiln 1.

Below the inlet or entry zone of the material discharge conduit 6 in the gas conduit 5 there is disposed a distributor member 9 for breaking up the stream of material and which in the embodiment shown in FIG. 1 is of frustoconical shape, being pivotable about a horizontal axis by means of a shaft 10 in the direction of the double arrow 11. The shaft is accessible from outside the conduit 5.

A number of burners 12 are disposed below the distributor member 9 and are arranged to form a combustion zone below the level of the distributor extending over substantially the full cross-section of the gas conduit 5.

The stream of material fed through the conduit 6 falls upon and is broken up by the distributor member 9, and depending on the setting of this member is fed more to one or another cross-sectional zone in the gas conduit 5 (arrows 13, 14). As mentioned earlier, the position of the distributor member 9 is so chosen that with non-uniform distribution of the exhaust gases passing through the gas conduit 5 (arrows 15, 16), the greater part of the material will be supplied to that cross-sectional zone of gas conduit 5 through which the stronger flow of gas is passing. The velocity of the gas flow through different cross-sectional zones of the conduit 5 may be determined in any one of a number of well-known ways.

After the particles of materials have passed from above downward through the combustion zone formed by the burners 12, they are to a large extent reversed by the rising gases (arrows 17, 18), so that they pass again through the said combustion zone (now from below upward) and are then separated in the cyclones 3 and 4. The relative particle size and the velocity of the exhaust gases are of course so selected that a substantial fraction of the particles are entrained by the gases.

Figure 2:
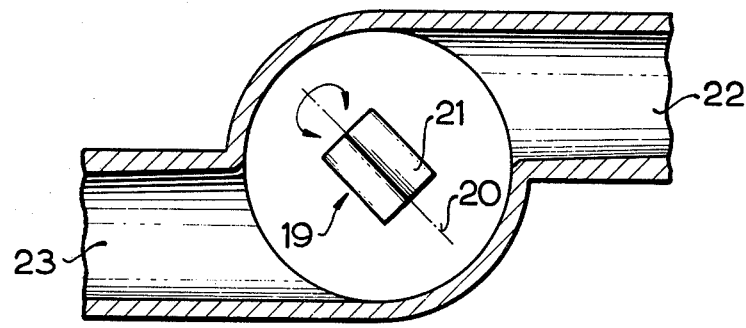
FIGS. 2 and 3 are horizontal and vertical sections, respectively, through a further embodiment (shown in part)
Figure 3:
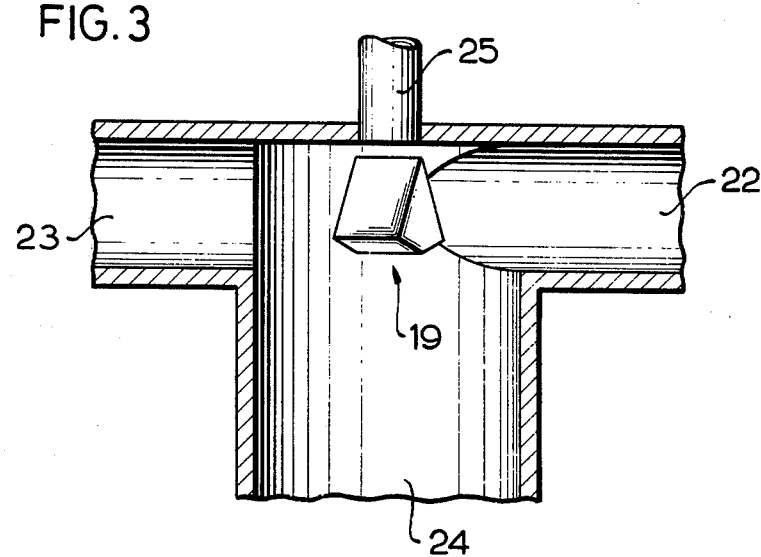

In the embodiment shown in FIGS. 2 and 3, the distributor member 19 is upwardly peaked or roof-shaped and is rotatable by means of a shaft having a generally horizontal axis 20. When the rotary distributor member 19 is in its central position, the gable edge 21 of the distributor member lies generally in the vertical plane of symmetry between the two gas conduits 22, 23 which form a generally tangential juncture with the common gas conduit 24 leading from the rotary kiln. Material is supplied from the penultimate cyclone stage via the conduit 25. Although not shown in FIGS. 2 and 3, it will be understood that a combustion zone is provided in the conduit 24 at a level below that of the distributor 19.

Figure 4:
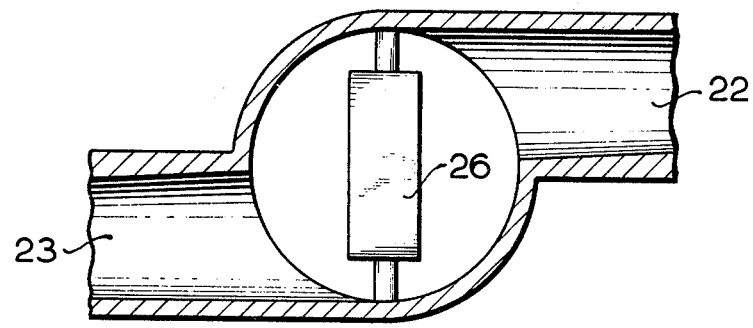
FIGS. 4 and 5 are horizontal and vertical sections, respectively, through a further variant.
Figure 5:
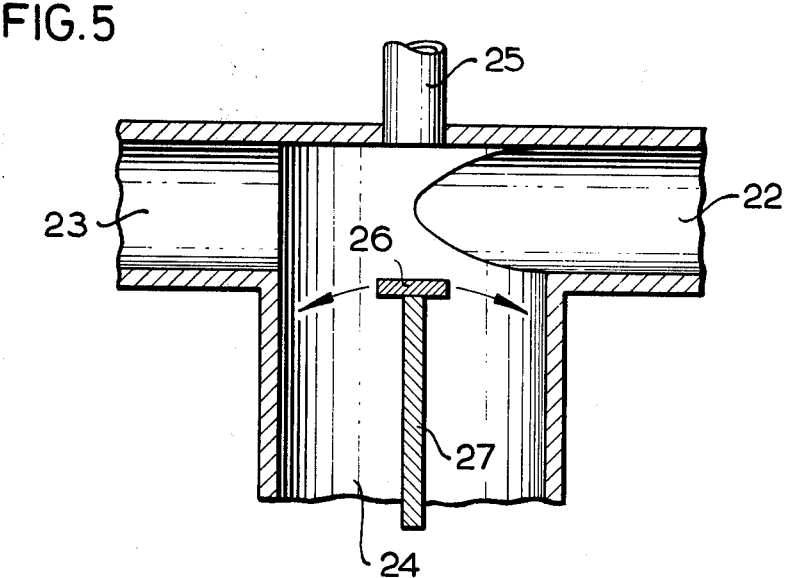

In the embodiment in FIGS. 4 and 5 the distributor member 26 comprises a plate fixed to a shaft pivotable about a horizontal axis 27. The axis 27 is at a level considerably lower than that of the plate 26, whereby the upper or material impact surface can be adjusted over the entire cross-section of the gas conduit.

Figure 6:
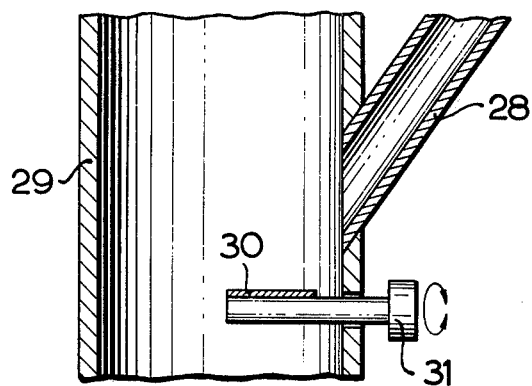
FIGS. 6 and 7 are partial vertical sections through two further embodiments.

In the embodiment in FIG. 6 a plate 30 carried by a shaft is pivotable about a horizontal axis 31 comprises the distributor member below the inlet of the material discharge conduit 28 in the gas conduit 29 leading from the rotary kiln to the preheater. Again, a combustion zone is provided in the conduit 29 below the level of the distributor.

Figure 7:
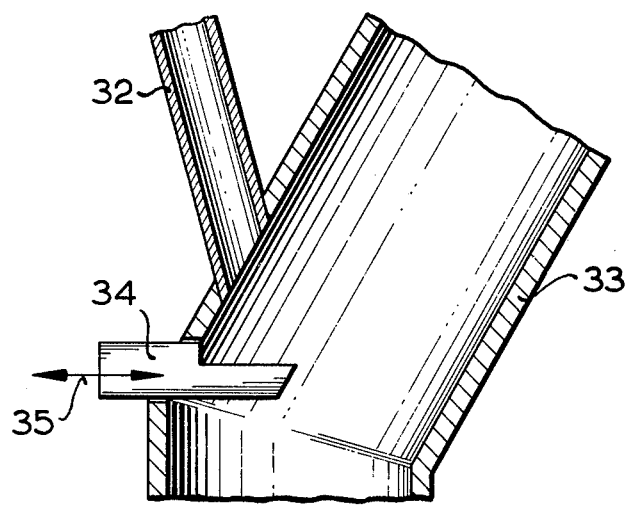

FIG. 7 shows a variation wherein below the inlet of the material discharge conduit 32 in the gas conduit 33 there is provided as the distributor member an impact tube which is displaceable in the horizontal direction (arrow 35). This impact tube can also be mounted to rotate about a horizontal axis. Again, a combustion zone is provided in the exhaust gas conduit 35 below the level of the distributor.

We claim:

1. In apparatus for the heat treatment of fine-grained material prior to firing said material in a furnace and wherein said apparatus includes a gas conduit having a substantially vertical portion, inlet means for introducing a fine-grained material to said conduit at a first level such that said material may fall downwardly through said vertical portion, means for combusting fuel in said conduit at a second level lower than said first level to provide at said second level a heating zone through which said material may fall, means in said conduit between said first and second levels for distributing said material over the cross-sectional area of said conduit as it falls downwardly, and means for delivering furnace exhaust gas to said conduit at a level below said heating zone and at such velocity with respect to the grain size of said material that at least part of the material which falls through said heating zone is entrained by said gas and passed again through said heating zone; the improvement comprising means adjustably mounting said distributing means for movement within said conduit between a plurality of positions, adjustment of said distributing means enabling the concentration of material in different cross-sectional areas of said conduit below said distributing means to be varied.

2. Apparatus according to claim 1 in which the mounting means for said distributing means is rotatable about a generally horizontal axis.

3. Apparatus according to claim 1 wherein the mounting means for said distributing means is reciprocable in a generally horizontal plane.

4. Apparatus according to claim 1 wherein said distributor means is frustoconical in shape.

5. Apparatus according to claim 1 wherein said distributor means is upwardly peaked.

6. Apparatus according to claim 1 wherein said gas conduit adjacent its upper end communicates with two generally tangential gas conduits.

7. Apparatus according to claim 6 wherein said distributing means is mounted generally in the vertical plane of symmetry between said two tangential gas conduits.

8. Apparatus according to claim 1 wherein said distributing means comprises a flat plate.

9. Apparatus according to claim 1 wherein said distributing means comprises a tube.

10. Apparatus according to claim 1 wherein the mounting means for said distributing means enables adjustment of the latter over the full cross-sectional area of said conduit.

11. Apparatus according to claim 1 wherein the velocity of gas passing through said conduit is different in different cross-sectional areas of said conduit.

12. Apparatus according to claim 11 wherein said distributing means is adjusted to a position in which material distributed thereby has a higher concentration in that portion of the cross-sectional area of said conduit having the greater gas velocity.

13. In a method for the heat treatment of fine-grained material prior to firing said material in a furnace having a vertical exhaust gas conduit and wherein the method comprises conducting exhaust gas from said furnace upwardly through said conduit at different velocities in different cross-sectional areas of said conduit, supplying fine-grained material having a grain size such that a substantial portion of said material will be entrained by said gas, introducing said material downwardly into said conduit at a first level between its upper and lower ends so that said material will fall downwardly through said conduit toward the lower end thereof prior to said portion being entrained by said gas, and combusting fuel in said conduit at a level below said first level to provide a heating zone through which said material passes as it falls toward the lower end of said conduit and through which said portion of said material again passes following its being entrained by said gas; the improvement comprising distributing said material over the cross-sectional area of said conduit and above said second level with reference to the differences in gas velocity so that the concentration of distributed material in different cross-sectional areas of the conduit varies in proportion to the velocity of said gas in said different cross-sectional areas of said conduit.

* * * * *